US007564450B2

(12) United States Patent
So

(10) Patent No.: US 7,564,450 B2
(45) Date of Patent: Jul. 21, 2009

(54) APPARATUS AND METHOD FOR DRIVING LIQUID CRYSTAL DISPLAY DEVICE

(75) Inventor: Hyun Jin So, Seoul (KR)

(73) Assignee: LG Display Co., Ltd., Seoul (KR)

( * ) Notice: Subject to any disclaimer, the term of this patent is extended or adjusted under 35 U.S.C. 154(b) by 858 days.

(21) Appl. No.: 11/151,426

(22) Filed: Jun. 14, 2005

(65) Prior Publication Data

US 2006/0125756 A1 Jun. 15, 2006

(30) Foreign Application Priority Data

Dec. 13, 2004 (KR) ..................... 10-2004-0105191

(51) Int. Cl.
*G09G 3/36* (2006.01)
*G06F 3/038* (2006.01)
*G09G 5/00* (2006.01)

(52) U.S. Cl. .......................... 345/204; 345/98; 345/100

(58) Field of Classification Search ................. 345/204, 345/87, 98–100
See application file for complete search history.

(56) References Cited

U.S. PATENT DOCUMENTS 6,683,603 B2 * 1/2004 Murai et al. ................ 345/204
2001/0022572 A1 * 9/2001 Murade ....................... 345/98
2004/0252112 A1 * 12/2004 Fukuda et al. .............. 345/204

* cited by examiner

*Primary Examiner*—Amare Mengistu
*Assistant Examiner*—Alexander S. Beck
(74) *Attorney, Agent, or Firm*—Morgan Lewis & Bockius LLP

(57) ABSTRACT

An apparatus for driving a liquid crystal display device disclosed includes a timing controller and a data buffer for storing first and second data control signals from the timing controller, the data buffer having a first buffer and a second buffer, each of the first and second buffers capable of storing an equal number of data control signals, wherein the first buffer stores the first data control signals and the second buffer stores second data control signals. The apparatus for driving a liquid crystal display device also includes a liquid crystal display panel having a first display area and a second display area, each display area having data lines. In addition, the apparatus for driving a liquid crystal display device includes a data driver having a first data driver portion for supplying the first data signals to the data lines in the first display area in a first horizontal direction and a second data driver portion for supplying the second data signals to the data lines in the second display area in a second horizontal direction opposite to the first horizontal direction.

10 Claims, 10 Drawing Sheets

APPARATUS AND METHOD FOR DRIVING LIQUID CRYSTAL DISPLAY DEVICE

This application claims the benefit of Korean Patent Application No. P2004-105191 filed in Korea on Dec. 13, 2004, which is hereby incorporated by reference.

BACKGROUND OF THE INVENTION

1. Field of the Invention

This invention relates to an apparatus and a method for driving a liquid crystal display device, capable of removing a screen distortion, implementing a high resolution and implementing a multi channel.

2. Description of the Related Art

In general, a liquid crystal display (LCD) device controls light transmittance of liquid crystal cells in accordance with data signals applied thereto, to thereby display an image. In particular, an active matrix type LCD device includes a switching device for each cell and has various applications, such as a monitor for a computer, an office equipment, and a cellular phone. A thin film transistor (TFT) is generally employed as the switching device for the active matrix type LCD device.

FIG. 1 is a schematic block diagram showing an apparatus for driving a liquid crystal display device according to a related art.

In FIG. 1, a related art LCD driving apparatus includes a liquid crystal display panel 2 having liquid crystal cells Clc arranged in a matrix-like manner at intersections between data lines DL and gate lines GL, a data driver 4 for applying data signals to the data lines DL, a gate driver 6 for applying gate signals to the gate lines GL, and a timing controller 8 for controlling the data driver 4 and the gate driver 6 using synchronizing signals H, V, and DE applied from a system 10.

The liquid crystal display panel 2 includes a plurality of liquid crystal cells Clc arranged, in a matrix-like manner, at the intersections between the data lines DL and the gate lines GL. The thin film transistor TFT provided at each liquid crystal cell Clc applies a data signal from each data line DL to the liquid crystal cell Clc in response to a scanning signal from the gate line GL. Further, each liquid crystal cell Clc is provided with a storage capacitor Cst. The storage capacitor Cst functions to maintain a voltage of the liquid crystal cell Clc constant.

The data driver 4 converts digital video data R, G and B into analog gamma voltages, i.e., data signals, corresponding to gray level values in response to a data control signal DCS from the timing controller 8, and applies the analog gamma voltages to the data lines DL.

The gate driver 6 sequentially applies a scanning pulse to the gate lines GL in response to a gate control signal GCS from the timing controller 8, thereby selecting horizontal lines of the liquid crystal display panel 2 to be supplied with the data signals.

The system 10 applies vertical/horizontal synchronizing signals V and H, a clock signal DCLK and a data enable signal DE to the timing controller 8. Further, the system 10 compresses a parallel digital data into a serial data using a low voltage differential signal interface (LVDS), and applies the compressed data to the timing controller 8.

The timing controller 8 generates the gate control signal GCS and the data control signal DCS for controlling the gate driver 6 and the data driver 4, respectively, using the vertical/horizontal synchronizing signals V and H, the clock signal DCLK and the data enable signal DE inputted from the system 10. The timing controller 8 also restores the data applied from the system 10 into a parallel data and supplies the restored data to the data driver 4.

A related art system 10 using the LVDS interface sequentially supplies data from the first data integrated circuit (IC) Dr1 to the nth data IC Drn, as shown in FIG. 2. However, since there is a delay in the data supply from the first data IC Dr1 to the nth data IC Drn, it is difficult to provide a high speed driving of a liquid crystal display device having a high resolution.

SUMMARY OF THE INVENTION

Accordingly, the present invention is directed to an apparatus and a method for driving a liquid crystal display device that substantially obviates one or more of the problems due to limitations and disadvantages of the related art.

An object of the present invention is to provide an apparatus and a method for driving a liquid crystal display device capable of removing a screen distortion, implementing a high resolution and implementing a multi channel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other objects of the invention, an apparatus for driving a liquid crystal display device includes a timing controller; a data buffer for storing first and second data control signals from the timing controller, the data buffer having a first buffer and a second buffer, each of the first and second buffers capable of storing an equal number of data control signals, wherein the first buffer stores the first data control signals and the second buffer stores second data control signals; a liquid crystal display panel having a first display area and a second display area, each display area having data lines; and a data driver having a first data driver portion for supplying the first data signals to the data lines in the first display area in a first horizontal direction and a second data driver portion for supplying the second data signals to the data lines in the second display area in a second horizontal direction opposite to the first horizontal direction.

In another aspect of the present invention, an apparatus for driving a liquid crystal display device includes a timing controller; a data buffer having a first buffer for storing first data control signals from the timing controller and a second data buffer for storing second data control signals from the timing controller, the first and second buffers each capable of storing an equal number of data control signals; a liquid crystal display panel having a first display area and a second display area, each display area having data lines; and a data driver having a first data driver portion for generating first data signals based on the first data control signals and supplying the first data signals to the data lines in the first display area and a second data driver portion for generating second data signals based on the second data control signals and supplying the second data signals to the data lines in the second display area in parallel with the first data driver portion supplying the first data signals to the data lines in the first display area.

In yet another aspect of the present invention, a method is provided for driving a liquid crystal display device having a timing controller, a data buffer having at least first and second buffers for temporarily storing data control signals from the timing controller, a liquid crystal display panel having at least first and second display areas, and a data driver, the method including dividing the data control signals into first data control signals and second data control signals; storing the first data control signals in the first buffer and the second data control signals in the second buffer; generating first data signals based on the first data control signals and supplying the first data signals to data lines in the first display area; and generating second data signals based on the second data control signals and supplying the second data signals to data lines in the second display area, wherein the generating and supplying of the first data signals is performed in parallel with the generating and supplying of the second data signals.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
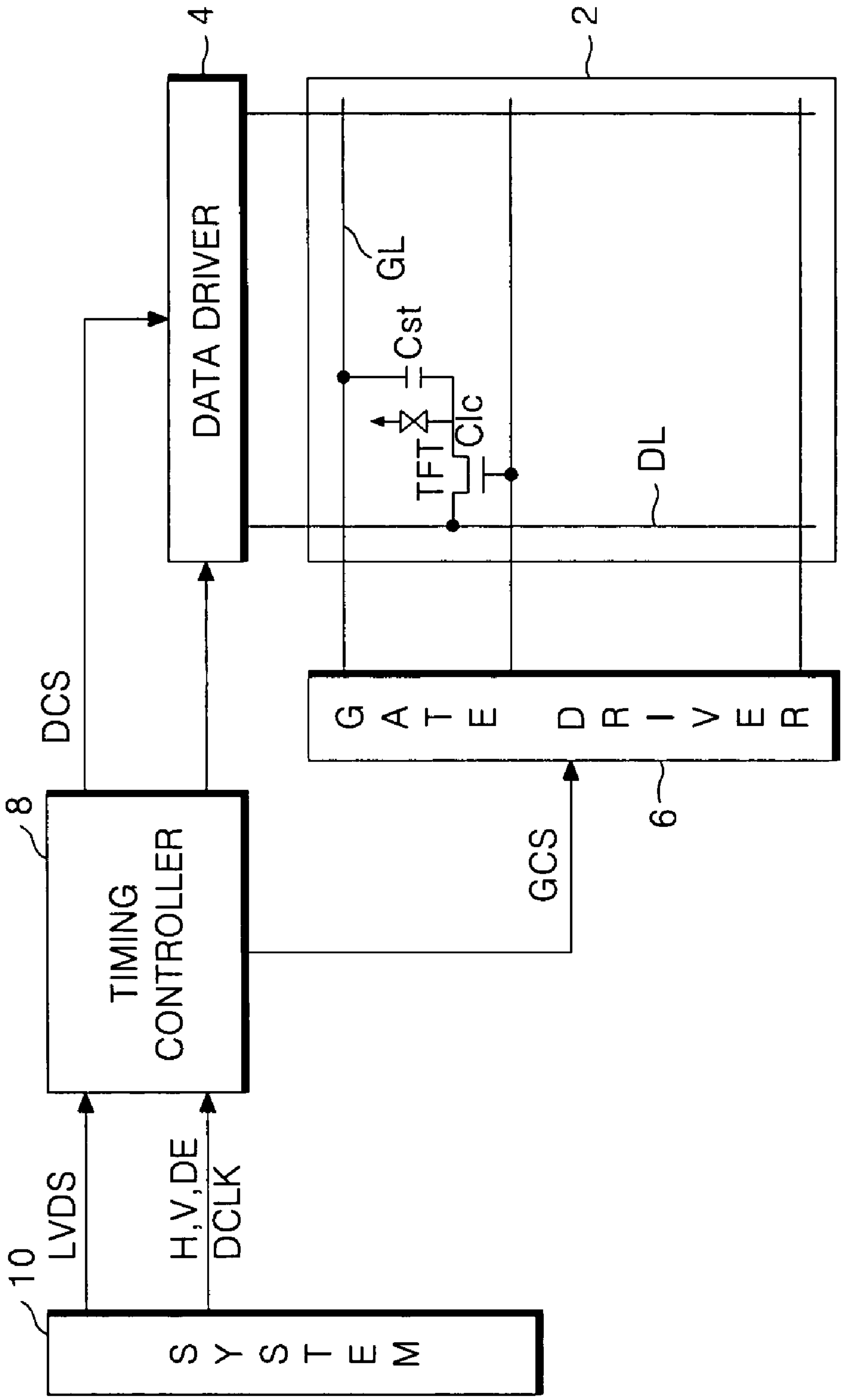
FIG. 1 RELATED ART
FIG. 1 is a schematic block diagram showing an apparatus for driving a liquid crystal display device according to a related art.
Figure 2:
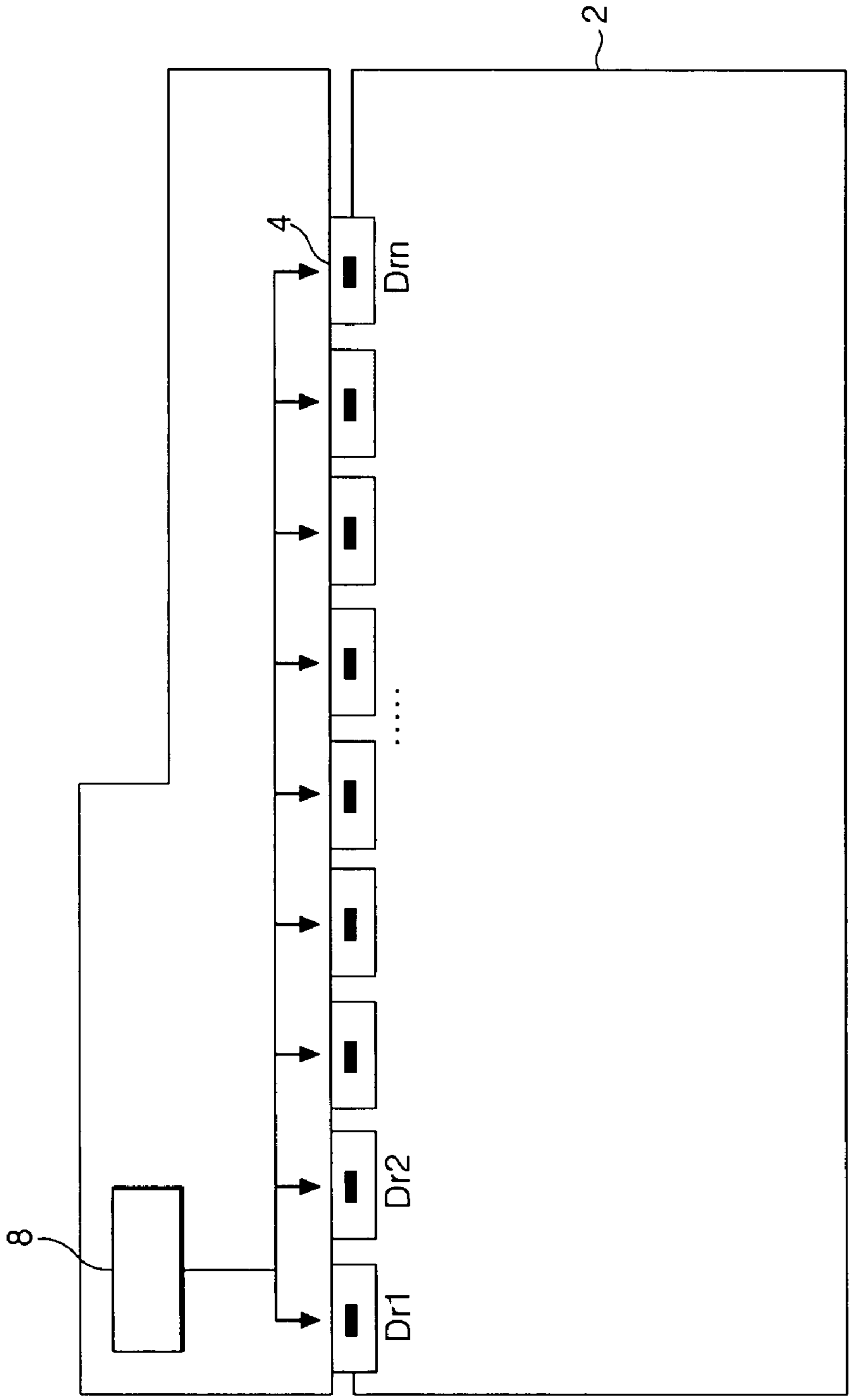
FIG. 2 RELATED ART
FIG. 2 is a detailed block diagram of a data driver shown in FIG. 1.
Figure 3:
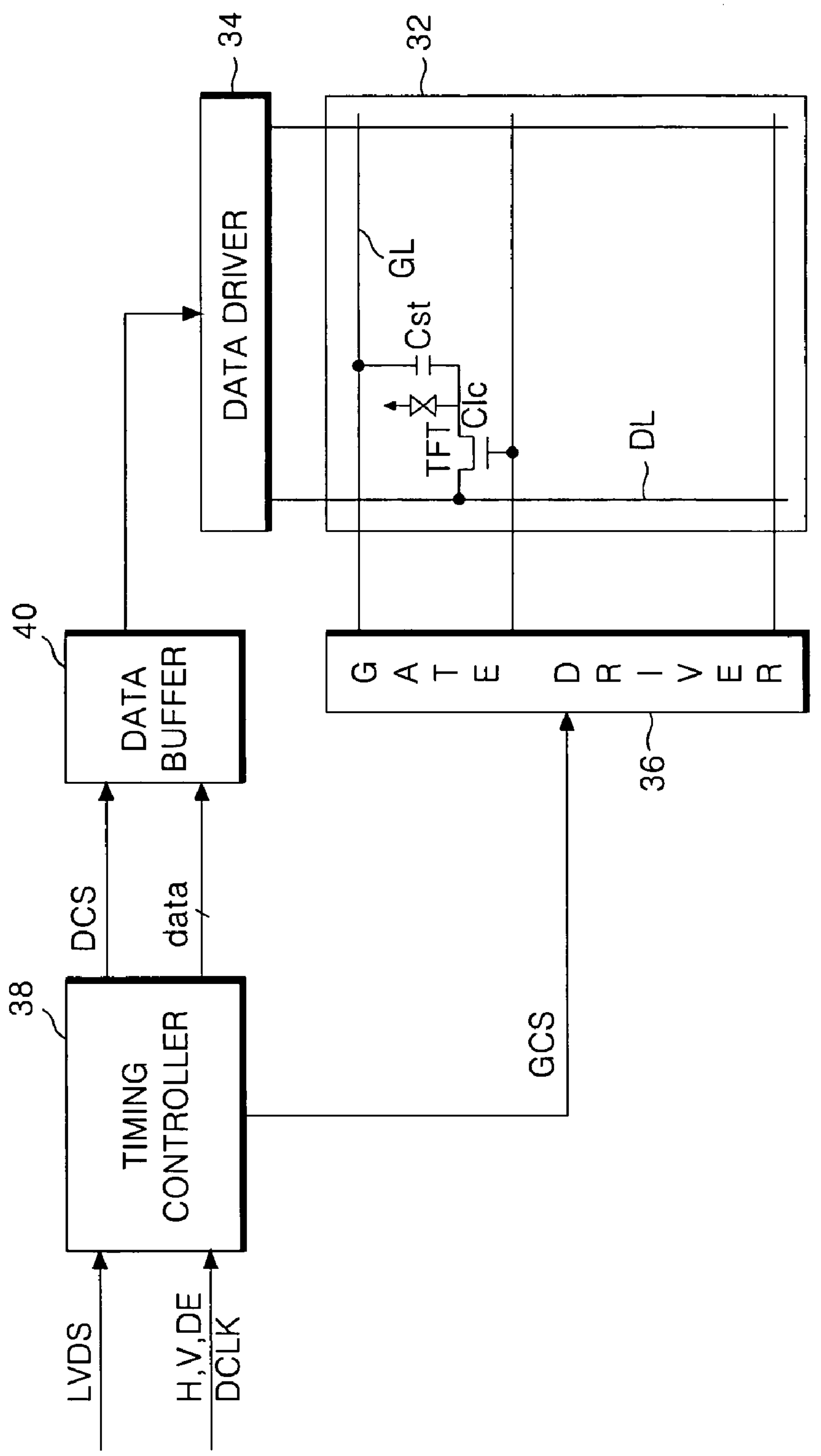
FIG. 3 is a schematic block diagram of an apparatus for driving a liquid crystal display device according to a first exemplary embodiment of the present invention.

FIG. 3 shows an apparatus for driving a liquid crystal display device according to a first embodiment of the present invention.

In FIG. 3, the apparatus for driving the liquid crystal display device according to the first embodiment of the present invention includes a liquid crystal display panel 32 having liquid crystal cells Clc arranged in a matrix-like manner at intersections between data lines DL and gate lines GL. The apparatus for driving the liquid crystal display also includes a data driver 34 for applying data signals to the data lines DL, a gate driver 36 for applying gate signals to the gate lines GL, a timing controller 38 for controlling the data driver 34 and the gate driver 36 using synchronizing signals H, V, DE and DCLK applied from an external system, and a data buffer 40 connected between the data driver 34 and the timing controller 38.

The liquid crystal display panel 32 includes a plurality of liquid crystal cells Clc arranged, in a matrix-like manner, at the intersections between the data lines DL and the gate lines GL. The thin film transistor TFT provided at each liquid crystal cell Clc applies a data signal from each data line DL to the liquid crystal cell Clc in response to a scanning signal from the gate line GL. Further, each liquid crystal cell Clc is provided with a storage capacitor Cst. The storage capacitor Cst functions to maintain a voltage of the liquid crystal cell Clc constant. The liquid crystal panel 32 is divided into a first group 32*a* and a second group 32*b* (see FIG. 4) to receive respective data signals.

Figure 4:
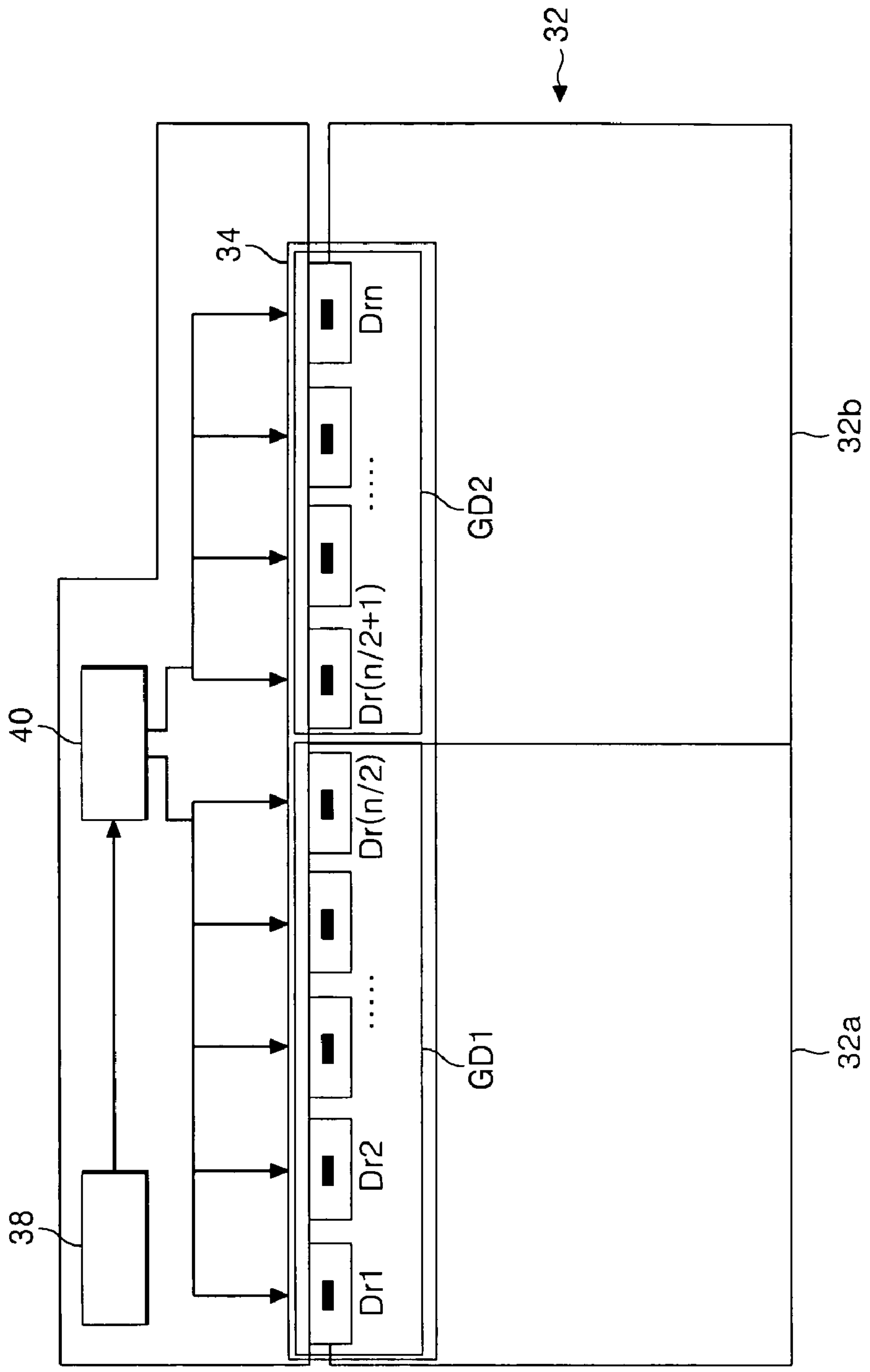
FIG. 4 is a schematic block diagram showing a relationship between the data driver and data buffer shown in FIG. 3 according to the first exemplary embodiment of the present invention.

As shown in FIG. 4, the data driver 34 converts digital video data R, G and B from the timing controller 38 through the data buffer 40 into analog gamma voltages, i.e., data signals, corresponding to gray level values in response to a data control signal DCS from the timing controller 38, and applies the analog gamma voltages to the data lines DL. Herein, the data driver 34 according to an embodiment of the present invention includes a plurality of data ICs Dr1 to Drn, which are divided by two groups and are driven with the respective data signals. More specifically, the data driver 34 according to the first embodiment of the present invention is divided into a first group GD1 having the first data IC Dr1 to the (n/2)th data IC Dr(n/2) and a second group GD2 having the (n/2+1)th data IC Dr(n/2+1) to nth data IC Drn, which are respectively driven. Accordingly, the data driver 34 according to the first embodiment of the present invention is capable of a high speed driving even through the number of data lines DL is increased for a higher resolution. In another embodiment of the present invention, the data ICs may be divided into more than two groups.

The gate driver 36 shown in FIG. 3 sequentially applies a scanning pulse to the gate lines GL in response to a gate control signal GCS from the timing controller 38, thereby selecting horizontal lines of the liquid crystal display panel 32 to be supplied with the data signals.

The timing controller 38 shown in FIG. 3 generates the gate control signal GCS and the data control signal DCS for controlling the gate driver 36 and the data driver 34 using the vertical/horizontal synchronizing signals V and H, the clock signal DCLK and the data enable signal DE inputted from an external system. The gate control signal GCS includes, for example, a gate start pulse GSP, a gate shift clock GSC, a gate output enable GOE, and the like. Further, the data control signal DCS includes, for example, a source start pulse SSP, a source shift clock SSC, a source output enable SOE, a polarity control signal POL, and the like.

Figure 5:
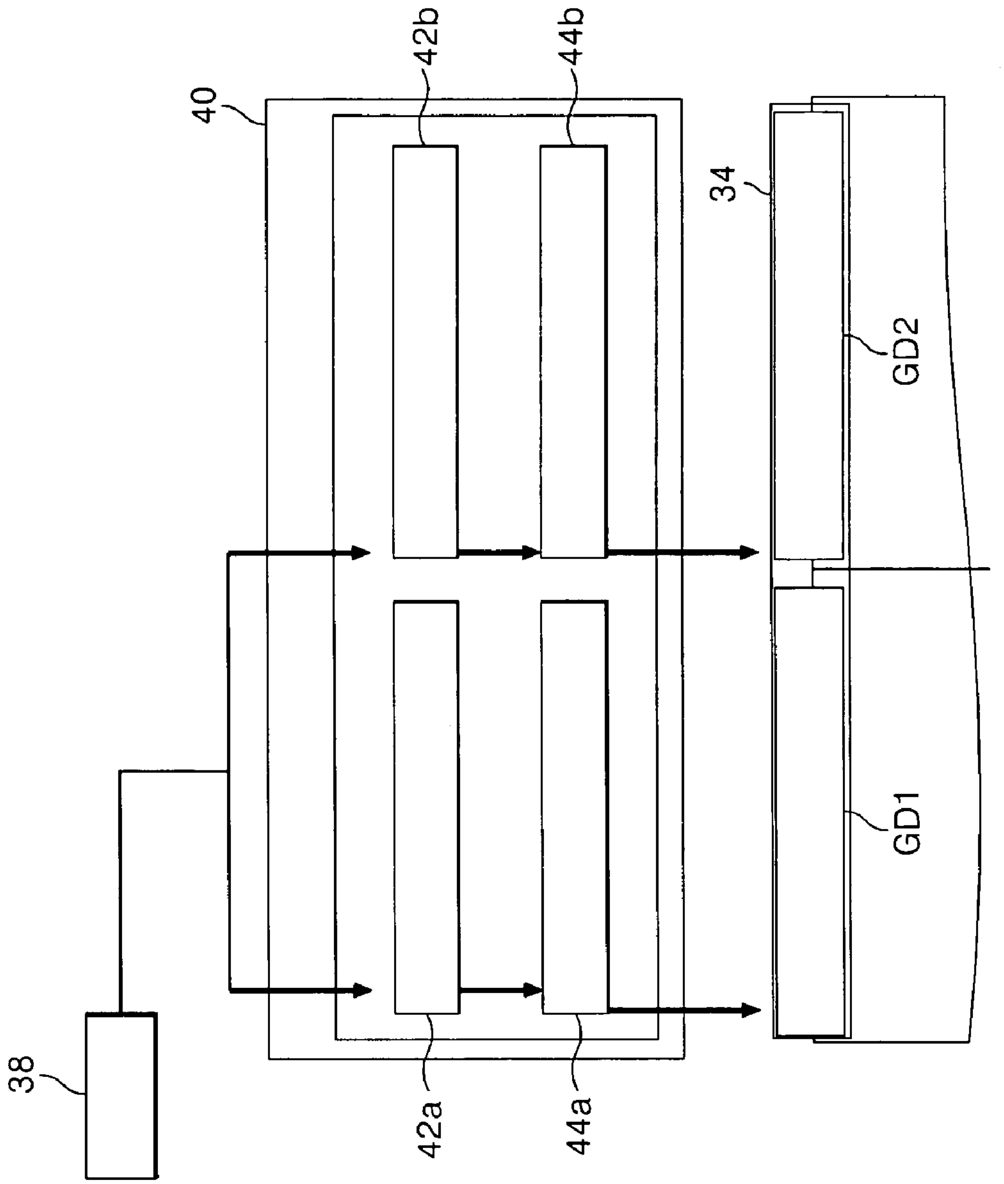
FIG. 5 is a detailed block diagram showing the data buffer shown in FIG. 4.

The data buffer 40 temporarily stores data control signals from the timing controller 38 to be applied to the data driver 34 before supplying the signals to the data driver 34. An exemplary embodiment of a data buffer 40 is shown in FIG. 5. The data buffer 40, for example, includes: a first group data storage register 42*a* for storing signals to be applied to the first group of data ICs GD 1; a second group data storage register 42*b* for storing signals to be applied to the second group of data ICs GD2; a first group data read register 44*a* for reading data stored in the first group data storage register 42*a* to supply it to the first group of data ICs GD1; and a second group data read register 44*b* for reading data stored in the second group data storage register 42*b* to supply it to the second group of data ICs GD2.

By the above compositions, the data driver 34 according to the first embodiment of the present invention is capable of receiving signals from the first group and the second group data read registers 44*a* and 44*b* in parallel.

A method for driving the liquid crystal display device according to the first embodiment of the present invention having the above compositions is described below.

The signals from the timing controller 38 are stored in each of the first group and the second group data storage registers 42*a* and 42*b* of the data buffer 40. Thereafter, the first and the second group data read registers 44*a* and 44*b* read data stored in the first and the second group data storage registers 42*a* and 42*b*, respectively, and then supply the read data to the first and the second group data ICs Dr1 to Drn included in the data driver 34. More specifically, the signals from the first group data read register 44*a* are sequentially supplied to the data ICs Dr1 to Dr(n/2) included in the first group GD1. In parallel, the signals from the second group data read register 44*b* are sequentially supplied to the data ICs Dr(n/2+1) to Drn included in the second group GD2.

In the apparatus for driving the liquid crystal display device according to the first embodiment of the present invention as detailed above, a screen distortion phenomenon can potentially be generated if the horizontal resolution of the input data does not appropriately match the number of data channels employed in the data buffer 40. More particularly, the data buffer 40 has a storage capacity for storing data of a given maximum horizontal resolution to drive a common multi-channel application specific integrated circuits (ASICs). Since the data buffer 40 has a capacity to store data of a given maximum horizontal resolution, if the signals to be stored in the data buffer 40 has a horizontal resolution less than the given maximum, the signals can end up being unevenly stored in the first and the second data read registers 42*a* and 42*b*. In other words, if the horizontal resolution of the input data is less than the given maximum, since the signals from the timing controller 38 are sequentially stored from the first group data storage register 42*a* to the second group data storage register 42*b*, the number of data stored in the first group data storage register 42*a* can end up being larger than the number of data stored in the second group data storage register 42*b*.

Figure 6:
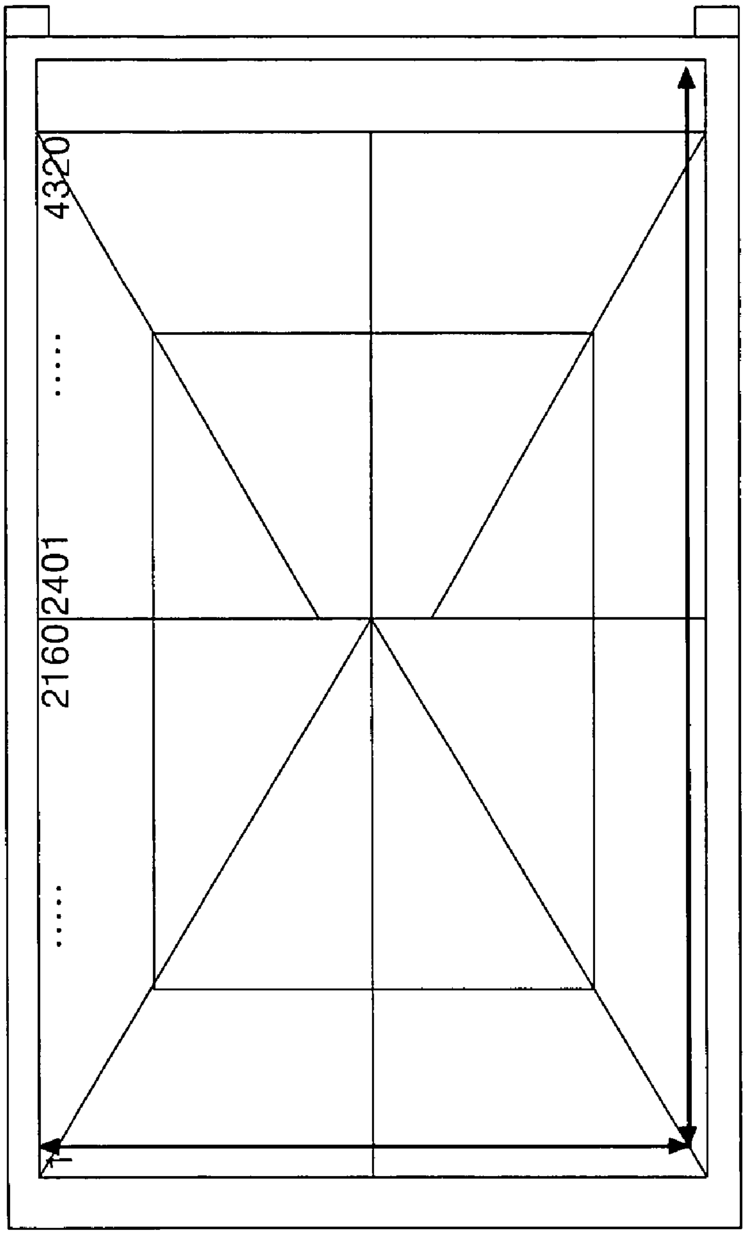
FIG. 6 is a block diagram showing a picture implement using the apparatus for driving a liquid crystal display device shown in FIG. 3.
Figure 7:
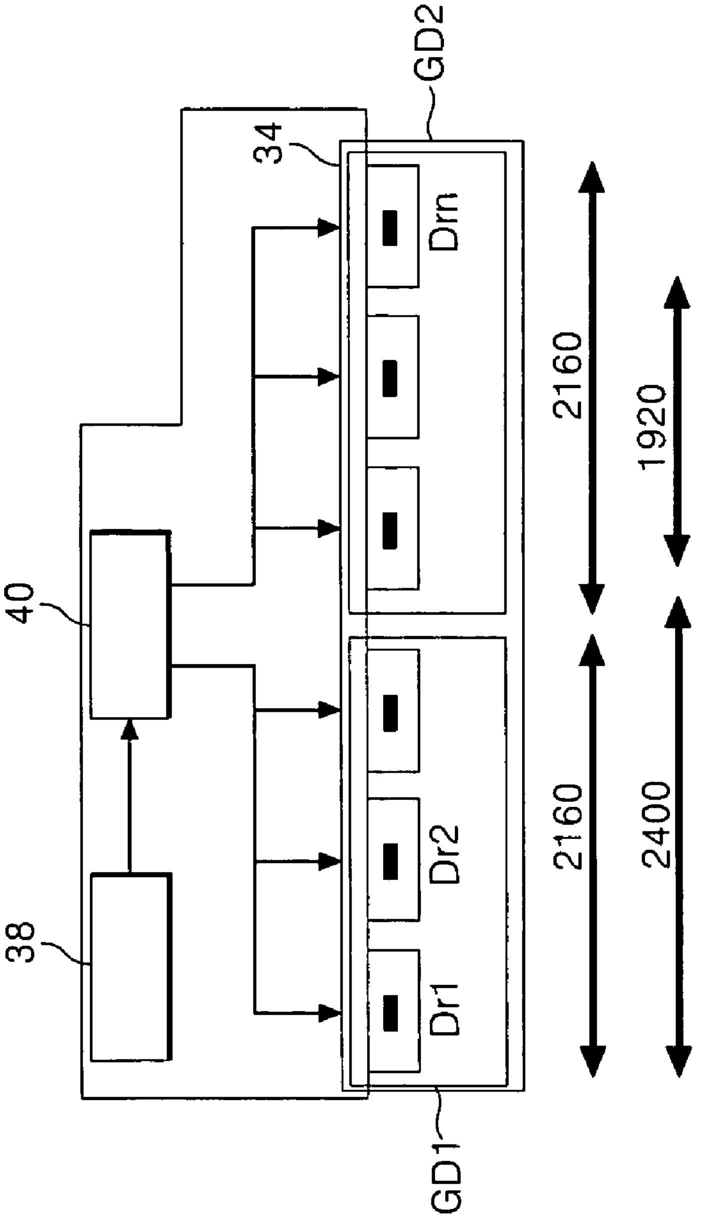
FIG. 7 is a block diagram showing a supply of the data signal in FIG. 6.

For example, if the data buffer 40 having 10 common data ICs with 480 channels (for the maximum resolution of 4800) is employed in the liquid crystal display device having the horizontal resolution of 4320, the data buffer 40 would include five data ICs each for first and second group data storage registers 42*a* and 42*b*. Since signals are stored sequentially from the first group data storage register 42*a* to the second group data storage register 42*b*, 2400 signals are stored in the first group data storage register 42*a* (in all five data ICs), and 1920 signals are stored in the second group data storage register 42*b* (in only four of the five data ICs). Such a data buffer 40 can potentially create a screen distortion as shown in FIG. 6 if employed in the liquid crystal display device satisfying the horizontal resolution of 4320 by using 6 data ICs in the data driver 34, each data IC having 720 channels, with three data ICs each in the first group GD1 and second group GD2. More particularly, as shown in FIG. 7, all of 2400 signals stored in the first group data storage register 42*a* are not supplied to the first group GD 1, and the number of signals corresponding to 2400−2160 (i.e., 720×3)=240 resolutions near the middle of the horizontal line to be displayed are treated as a dump. Further, only 1920 signals are stored in the second group data storage register 42*b*, eventually leaving 240 (i.e., 2160−1920) data lines without data signals supplied thereto. Therefore, as shown in FIG. 6, a screen distortion may potentially be generated.

Figure 8:
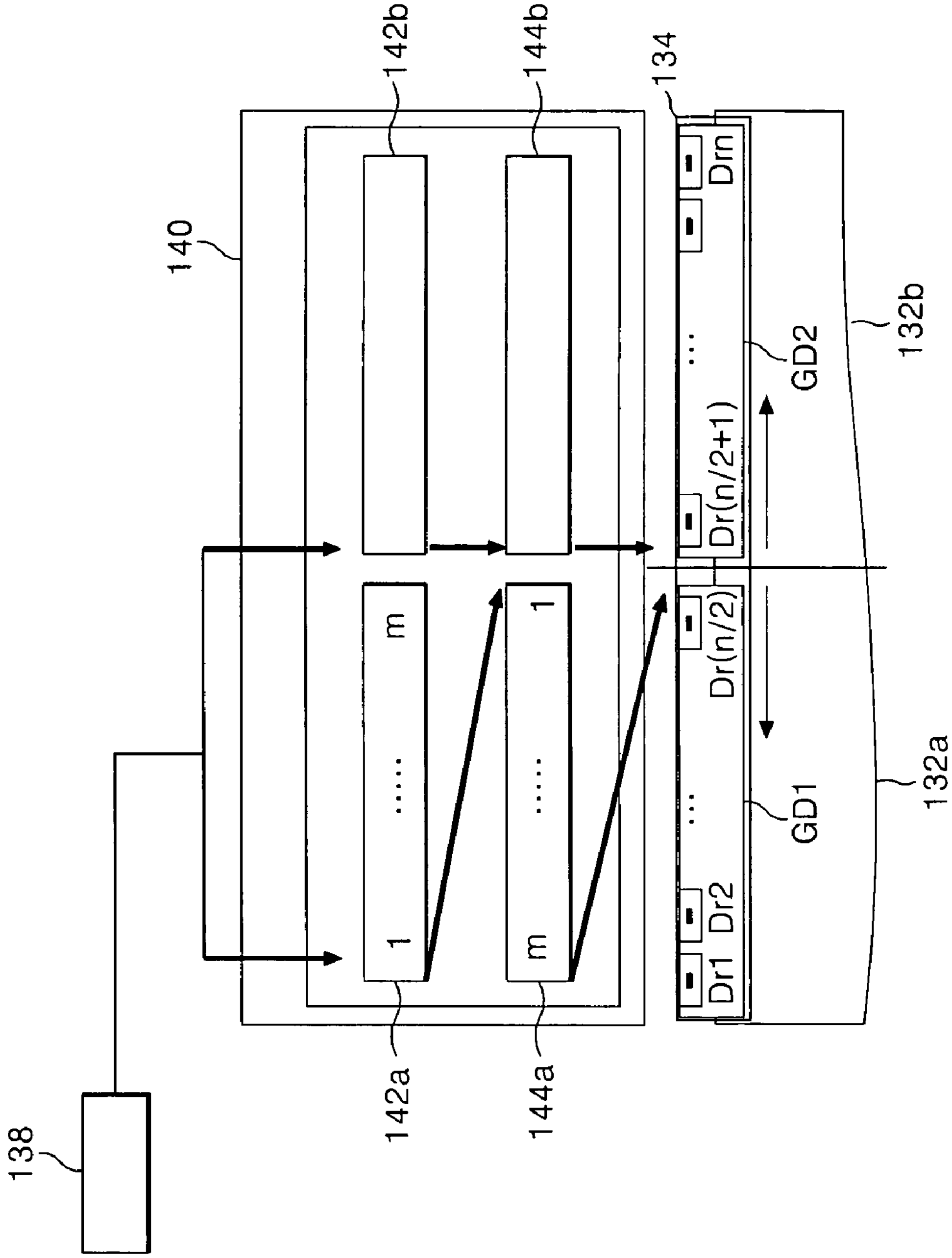
FIG. 8 is a block diagram showing a data buffer and a data driver according to a second exemplary embodiment of the present invention.

In a system for driving a liquid crystal display device according a second embodiment of the present invention, the signals are equally divided and evenly stored in the data buffer 140. Thus, it is possible to avoid a potential problem of screen distortion described above. More specifically, in the apparatus for driving the liquid crystal display device according to the second embodiment of the present invention, as shown in FIG. 8, the signals from the timing controller 138 are equally divided and stored in the fist group and the second group data storage registers 142*a* and 142*b*, respectively, of the data buffer 140. For example, the signals are sequentially stored from the left side of each of the first group and the second group data storage registers 142*a* and 142*b*. Thereafter, as shown in FIG. 8, the first group data read register 144*a* reads the signals stored in the first group data storage register 142*a* by inverting the horizontal location of the signals, and the second group data read register 144*b* reads the signal of each of the second group data storage registers 142*b* by maintaining the horizontal location of the signal. Then, as shown in FIG. 8, the signals from the first group data read register 144*a* are applied to the first group data ICs Dr1 to Dr(n/2), with the horizontal position of the signals again being inverted, and the signals from the second group data read register 144*b* are applied to the second group data ICs Dr(n/2+1) to Drn, with the horizontal position of the signals maintained. Alternatively, the horizontal location of the signals may be maintained in the first group data read register 144*a* and data ICs GD1, and inverted in the second group data read register 144*b* and data ICs GD2.

Figure 9:
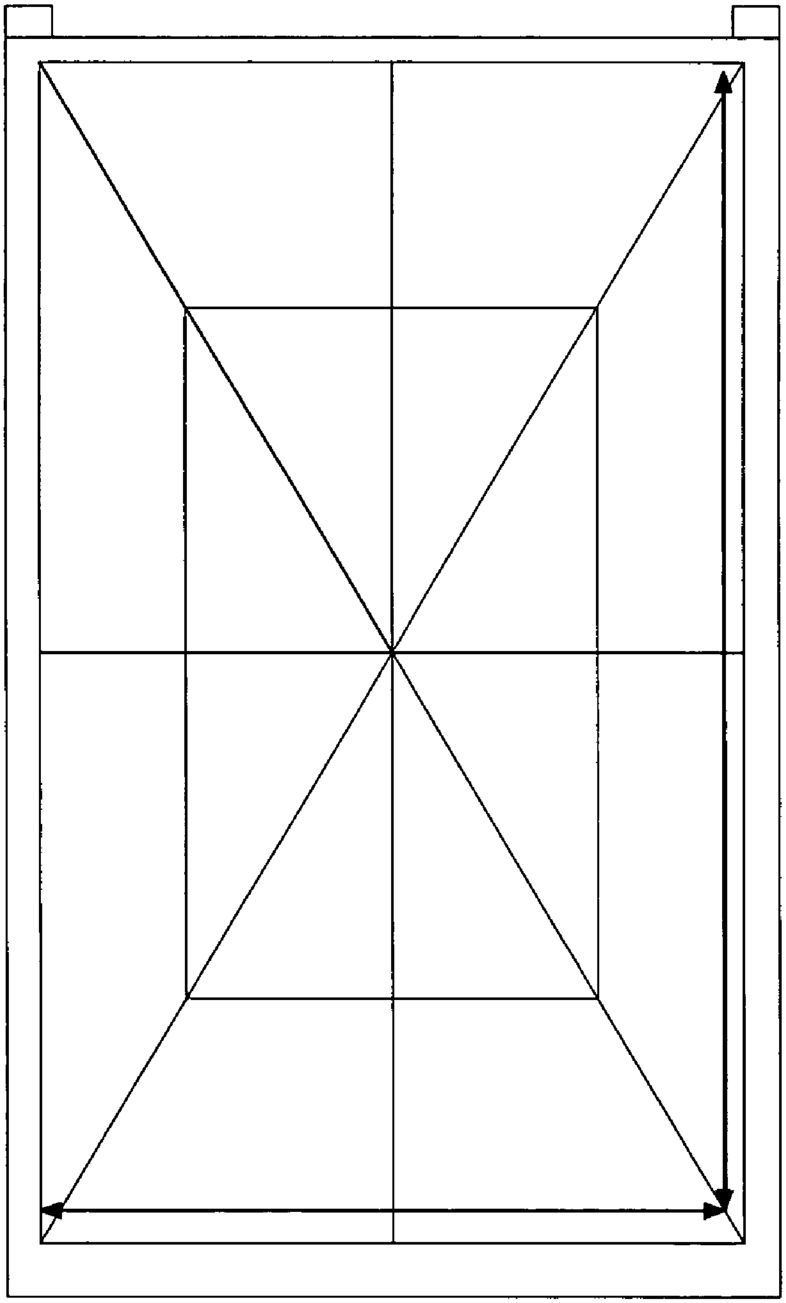
FIG. 9 is a block diagram showing a picture implement using the apparatus for driving a liquid crystal display device shown in FIG. 8.

More specifically, if the signals stored in sequence from the left side to right side in the first group data storage register 142*a* are 1 to m, then the first group data read register 144*a* read inversely the signals from the first group data storage register 142*a* in sequence from m to 1. Then, the first group data read register 144*a* supplies the signals m to 1 in sequence from the rightmost data IC Dr(2/n) connected to the first group 132*a* of the liquid crystal display panel to the leftmost data IC Dr1, respectively. In contrast to the first group data read register 144*a*, the second group data read register 144*b* sequentially performs the read operations without inverting the position or sequence of signals. In the apparatus for driving the liquid crystal display device according to the second embodiment of the present invention, as shown in FIG. 9, the signals are not treated as a dump and are supplied in an area where a real image is displayed. As a result, a potential screen distortion can be avoided. Herein, the method for driving the liquid crystal display device according to the second embodiment of the present invention uses 6 data ICs, each data IC having 720 channels, to equally divide the data into 2160 signals on the left side and 2160 signals on the right side. Accordingly, it is possible to drive a liquid crystal display device having a high resolution, e.g., a 1440×900 picture resolution requiring 1440×3 (for R, G, and B)=4320 data lines, at a high speed using the apparatus and method of the present invention.

Figure 10:
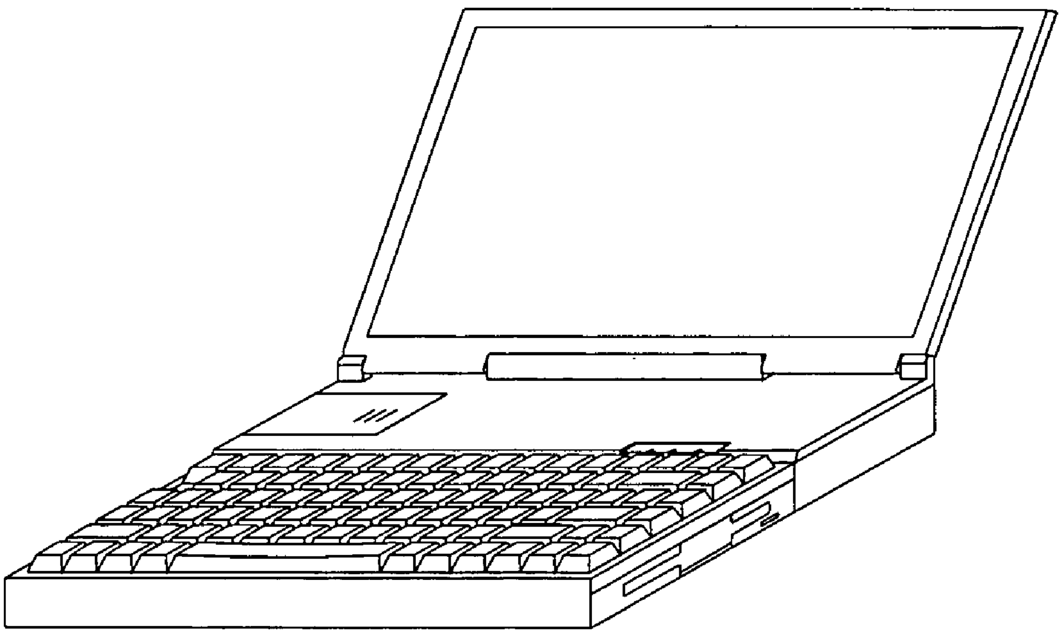
FIG. 10 is a configuration showing a notebook computer into which the apparatus for driving the liquid crystal display device according to the embodiments of the present invention is assembled.

The apparatus for driving the liquid crystal display device according to the embodiment of the present invention can be applied in a various industrial field such as monitors, televisions, portable information equipment, general information equipment, and office information equipment like a notebook computer as shown in FIG. 10.

As described above and shown in FIG. 8, in the apparatus and the method for driving the liquid crystal display device according to an embodiment of the present invention, data control signals can be supplied in sequence from the data lines in the center of the display toward the data lines on the outer edges of the display on both sides. Accordingly, even if the horizontal resolution of the liquid crystal display is less than the maximum resolution supported by the storage capacity of the data buffer 140, a data dump of signals to be supplied to data lines near the middle of the display is prevented, thereby avoiding a potential screen distortion.

It will be apparent to those skilled in the art that various modifications and variations can be made in the apparatus and method for driving a liquid crystal display device of the present invention without departing from the sprit or scope of the invention. Thus, it is intended that the present invention covers the modifications and variations of this invention provided they come within the scope of the appended claims and their equivalents.

What is claimed is:

1. An apparatus for driving a liquid crystal display device comprising:

a timing controller;

a data buffer for storing first and second data control signals from the timing controller, the data buffer having a first buffer and a second buffer, each of the first and second buffers capable of storing an equal number of data control signals, wherein the first buffer stores the first data control signals and the second buffer stores second data control signals;

a liquid crystal display panel having a first display area and a second display area, each display area having data lines; and a data driver having a first data driver portion for supplying the first data signals to the data lines in the first display area in a first horizontal direction and a second data driver portion for supplying the second data signals to the data lines in the second display area in a second horizontal direction opposite to the first horizontal direction, wherein the first buffer includes a first data storage register for storing the first data control signals and a first data read register for reading the first data control signals from the first data storage register and supplying the first data control signals to the first data driver portion, wherein the second buffer includes a second data storage register for storing the second data control signals and a second data read register for reading the second data control signals from the second data storage register and supplying the second data control signals to the second data driver portion, wherein the first data read register stores the first data control signals from the first data storage register in a first sequence and then supplies the stored first data control signals, in a sequence inverse to the first sequence, to the first data driver portion in the first horizontal direction.

2. The apparatus according to claim 1 wherein the second data read register stores the second data control signals from the second data storage register in a second sequence and then supplies the stored second data control signals, in the second sequence, to the second data driver portion in the second horizontal direction.

3. The apparatus according to claim 1, wherein the first horizontal direction is from right to left toward the left edge of the liquid crystal display panel, and the second horizontal direction is from left to right toward the right edge of the liquid crystal display panel.

4. An apparatus for driving a liquid crystal display device comprising:

a timing controller;

a data buffer having a first buffer for storing first data control signals from the timing controller and a second buffer for storing second data control signals from the timing controller, the first and second buffers each capable of storing an equal number of data control signals;

a liquid crystal display panel having a first display area and a second display area, each display area having data lines; and a data driver having a first data driver portion for generating first data signals based on the first data control signals and supplying the first data signals to the data lines in the first display area and a second data driver portion for generating second data signals based on the second data control signals and supplying the second data signals to the data lines in the second display area in parallel with the first data driver portion supplying the first data signals to the data lines in the first display area, wherein the first buffer includes a first data storage register for storing the first data control signals and a first data read register for reading the first data control signals from the first data storage register and supplying the first data control signals to the first data driver portion, wherein the second buffer includes a second data storage register for storing the second data control signals and a second data read register for reading the second data control signals from the second data storage register and supplying the second data control signals to the second data driver portion, wherein the first data read register stores the first data control signals from the first data storage register in a first sequence and then supplies the stored first data control signals, in a sequence inverse to the first sequence, to the first data driver part in a first horizontal direction.

5. The apparatus according to claim 4, wherein the second data read register stores the second data control signals from the second data storage register in a second sequence and then supplies the stored second data control signals, in the second sequence, to the second data driver part in a second horizontal direction, opposite to the first horizontal direction.

6. The apparatus according to claim 4 wherein the first data driver portion supplies the first data signals to the data lines in the first display area in sequence in a first horizontal direction, and the second data driver portion supplies the second data signals to the data lines in the second display area in sequence in a second horizontal direction opposite to the first horizontal direction.

7. The apparatus according to claim 6, wherein the first horizontal direction is from right to left toward the left edge of the liquid crystal display panel, and the second horizontal direction is from left to right toward the right edge of the liquid crystal display panel.

8. A method for driving a liquid crystal display device comprising a timing controller, a data buffer having at least first and second buffers for temporarily storing data control signals from the timing controller, a liquid crystal display panel having at least first and second display areas, and a data driver, the method comprising steps of:

dividing the data control signals into first data control signals and second data control signals;

storing the first data control signals in the first buffer and the second data control signals in the second buffer;

generating first data signals based on the first data control signals and supplying the first data signals to data lines in the first display area; and generating second data signals based on the second data control signals and supplying the second data signals to data lines in the second display area, wherein the generating and supplying of the first data signals is performed in parallel with the generating and supplying of the second data signals, wherein the number of the first data control signals stored in the first buffer is substantially equal to the number of second data control signals stored in the second buffer, wherein the data driver includes a first data driver part and a second data driver part, and the storing includes storing the first data control signals from the first data storage register in a first sequence, the method further comprising;

supplying the stored first data control signals, in a sequence inverse to the first sequence, to the first data driver part in a first horizontal direction.

9. The method according to claim 8, wherein the storing includes storing the second data control signals in a second sequence, the method further comprising:

supplying the stored second data control signals, in the second sequence, to the second data driver part in a second horizontal direction, opposite to the first horizontal direction.

10. The method according to claim 8, wherein the supplying of the first data signals to the data lines in the first display area includes supplying the first data signals in sequence in a first horizontal direction, and the supplying of the second data signals in the second display area includes supplying the second data signals in sequence in a second horizontal direction opposite to the first horizontal direction, wherein the first horizontal direction is from right to left toward the left edge of the liquid crystal display panel, and the second horizontal direction is from left to right toward the right edge of the liquid crystal display panel.

* * * * *